United States Patent
Yang et al.

(10) Patent No.: US 11,157,712 B2
(45) Date of Patent: Oct. 26, 2021

(54) FINGERPRINT RECOGNITION DRIVING CIRCUIT, FINGERPRINT RECOGNITION MODULE, TOUCH SCREEN, DISPLAY DEVICE AND FINGERPRINT RECOGNITION DRIVING METHOD

(71) Applicant: BOE TECHNOLOGY GROUP CO., LTD., Beijing (CN)

(72) Inventors: Shengji Yang, Beijing (CN); Xue Dong, Beijing (CN); Xiaochuan Chen, Beijing (CN); Hui Wang, Beijing (CN); Pengcheng Lu, Beijing (CN); Shengnan Li, Beijing (CN); Kuanta Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/255,922

(22) PCT Filed: May 6, 2020

(86) PCT No.: PCT/CN2020/088819
§ 371 (c)(1),
(2) Date: Dec. 23, 2020

(87) PCT Pub. No.: WO2020/228573
PCT Pub. Date: Nov. 19, 2020

(65) Prior Publication Data
US 2021/0264126 A1 Aug. 26, 2021

(30) Foreign Application Priority Data
May 16, 2019 (CN) .......................... 201910407471.7

(51) Int. Cl.
| | | |
|---|---|---|
| G06K 9/00 | (2006.01) | |
| G06F 3/041 | (2006.01) | |
| G06F 3/044 | (2006.01) | |

(52) U.S. Cl.
CPC ......... *G06K 9/0002* (2013.01); *G06F 3/0412* (2013.01); *G06F 3/0445* (2019.05); *G06F 3/04166* (2019.05); *G06K 9/00087* (2013.01)

(58) Field of Classification Search
None
See application file for complete search history.

(56) References Cited

U.S. PATENT DOCUMENTS

2016/0092716 A1* 3/2016 Yazdandoost ........ G06K 9/0002
382/124
2016/0217739 A1 7/2016 Kang et al.
(Continued)

FOREIGN PATENT DOCUMENTS

| CN | 104103239 A | 10/2014 |
| CN | 104778923 A | 7/2015 |

(Continued)

OTHER PUBLICATIONS

First office action of Chinese application No. 201910407471.7 dated Sep. 23, 2020.
(Continued)

*Primary Examiner* — Nicholas J Lee
(74) *Attorney, Agent, or Firm* — Fay Sharpe LLP (57) ABSTRACT

Fingerprint recognition driving circuit and method, fingerprint recognition module and touch screen are provided. The circuit includes: a first charge storing sub-circuit, a data acquiring sub-circuit configured to write output voltage of an ultrasonic sensor into a first end of the first charge storing sub-circuit, a driving sub-circuit including a driving transistor, a second charge storing sub-circuit, a circuit compen-
(Continued)

sating sub-circuit configured to charge the second charge storing sub-circuit through the first charge storing sub-circuit and the driving transistor ill potential at a first end of the second charge storing sub-circuit equals the sum of output voltage of the ultrasonic sensor and threshold voltage of the driving transistor, and an output controlling sub-circuit configured to transmit a current signal output by the driving transistor to a signal reading circuit.

20 Claims, 7 Drawing Sheets

(56) References Cited

U.S. PATENT DOCUMENTS

| | | |
|---|---|---|
| 2016/0260380 A1 | 9/2016 | Yang |
| 2017/0079624 A1 | 3/2017 | Wadhwa et al. |
| 2017/0103706 A1 | 4/2017 | Yang et al. |
| 2017/0205941 A1* | 7/2017 | Liu ................. G06F 3/04166 |
| 2018/0046836 A1* | 2/2018 | Hinger ................ G06K 9/0002 |
| 2018/0130419 A1 | 5/2018 | He et al. |
| 2018/0158417 A1 | 6/2018 | Xiang et al. |
| 2018/0166017 A1 | 6/2018 | Li et al. |
| 2019/0171860 A1* | 6/2019 | Wu ....................... G06K 9/0002 |
| 2020/0193118 A1 | 6/2020 | Ding et al. |

FOREIGN PATENT DOCUMENTS

| | | | | |
|---|---|---|---|---|
| CN | 107092900 A | * | 8/2017 | ........... G06K 9/0002 |
| CN | 107342043 A | | 11/2017 | |
| CN | 107481669 A | | 12/2017 | |
| CN | 107491774 A | | 12/2017 | |
| CN | 107610645 A | | 1/2018 | |
| CN | 107659204 A | | 2/2018 | |
| CN | 108537179 A | | 9/2018 | |
| CN | 108564922 A | | 9/2018 | |
| CN | 108596160 A | | 9/2018 | |
| CN | 108682386 A | | 10/2018 | |
| CN | 108806587 A | | 11/2018 | |
| CN | 110110691 A | | 8/2019 | |

OTHER PUBLICATIONS

Notification to grant patent right for invention of Chinese application No. 201910407471.7 dated Mar. 9, 2021.

* cited by examiner

FINGERPRINT RECOGNITION DRIVING CIRCUIT, FINGERPRINT RECOGNITION MODULE, TOUCH SCREEN, DISPLAY DEVICE AND FINGERPRINT RECOGNITION DRIVING METHOD

The present application is a 371 of PCT Application No. PCT/CN2020/088819, filed on May 6, 2020, which claims priority to Chinese Patent Application No. 201910407471.7, filed on May 16, 2019 and titled "FINGERPRINT RECOGNITION DRIVING CIRCUIT, FINGERPRINT RECOGNITION MODULE, TOUCH SCREEN AND FINGERPRINT RECOGNITION DRIVING METHOD", which are incorporated herein by reference in their entireties.

TECHNICAL FIELD

The present disclosure relates to the field of touch technologies, and in particular, to a fingerprint recognition driving circuit, a fingerprint recognition module, a touch screen, a display device and a fingerprint recognition driving method.

BACKGROUND

In recent years, biologic recognition has gradually become a standard configuration of mobile terminal, and fingerprint recognition technology has become the most widely used biologic recognition technology owing to its outstanding convenience and security. The fingerprint recognition technology includes capacitive fingerprint recognition technology, optical fingerprint recognition technology and ultrasonic fingerprint recognition technology. The capacitive fingerprint recognition technology and the optical fingerprint recognition technology are mostly applied to a non-display area of a display screen of the mobile terminal, and the ultrasonic fingerprint recognition technology is a fingerprint recognition technology applicable to a display area of the display screen.

SUMMARY

Embodiments of the present disclosure provides a fingerprint recognition driving circuit, a fingerprint recognition module, a touch screen, a display device and a fingerprint recognition driving method.

In one aspect, an embodiment of the present disclosure provides a fingerprint recognition driving circuit, including:

a first charge storing sub-circuit;

a data acquiring sub-circuit, which is electrically connected to a first scanning signal end, an ultrasonic sensor and a first end of a first charge storing sub-circuit and is configured to write an output voltage of the ultrasonic sensor into the first end of the first charge storing sub-circuit under control of a first scanning signal received from the first scanning signal end;

a driving sub-circuit including a driving transistor having a first electrode electrically connected to the first end of the first charge storing sub-circuit;

a second charge storing sub-circuit having a first end electrically connected to a control electrode of the driving transistor;

a circuit compensating sub-circuit, which is electrically connected to a second scanning signal end, a second electrode of the driving transistor and the first end of the second charge storing sub-circuit and is configured to charge the second charge storing sub-circuit through the first charge storing sub-circuit and the driving transistor under control of a second scanning signal received from the second scanning signal end till a potential at the first end of the second charge storing sub-circuit equals a sum of the output voltage of the ultrasonic sensor and a threshold voltage of the driving transistor; and an output controlling sub-circuit, which is electrically connected to a control signal inputting end, the second electrode of the driving transistor and a signal reading circuit and is configured to transmit a current signal output by the driving transistor to a signal reading circuit under control of a control signal received from the control signal inputting end.

In an implementation of the embodiment of the present disclosure, the circuit compensating sub-circuit includes:

a first transistor having a control electrode electrically connected to the second scanning signal end and configured to receive the second scanning signal provided by the second scanning signal end, a first electrode electrically connected to the second electrode of the driving transistor and a second electrode electrically connected to the first end of the second charge storing sub-circuit. The first transistor is configured to be turned on under control of the second scanning signal and to output an electric signal to the first end of the second charge storing sub-circuit through the first charge storing sub-circuit and the driving transistor when turned on.

Optionally, the fingerprint recognition driving circuit further includes a resetting sub-circuit, which is electrically connected to a resetting signal end, a third scanning signal end, the first end of the first charge storing sub-circuit and the first end of the second charge storing sub-circuit and is configured to reset a potential at the first end of the first charge storing sub-circuit to a first potential under control of a resetting signal received from the resetting signal end, and to reset the potential at the first end of the second charge storing sub-circuit to a second potential under control of a third scanning signal received from the third scanning signal end. The first potential is different from the second potential.

In an implementation of the embodiment of the present disclosure, the resetting sub-circuit includes:

a second transistor, having a control electrode electrically connected to the resetting signal end and configured to receive a resetting signal provided by the resetting signal end, a first electrode electrically connected to a supply voltage signal end and configured to receive a supply voltage signal provided by the supply voltage signal end, and a second electrode electrically connected to the first end of the first charge storing sub-circuit, the second transistor being configured to be turned on under control of the resetting signal and to transmit the supply voltage signal to the first end of the first charge storing sub-circuit when turned on; and a third transistor, having a control electrode electrically connected to the third scanning signal end and configured to receive a third scanning signal, a first electrode electrically connected to an initial voltage signal end and configured to receive an initial voltage signal provided by the initial voltage signal end and a second electrode electrically connected to the first end of the second charge storing sub-circuit; the third transistor being configured to be turned on under control of the third scanning signal and to transmit the initial voltage signal to the first end of the second charge storing sub-circuit when turned on.

In an implementation of the embodiment of the present disclosure, the third scanning signal end and the first scanning signal end are the same signal end.

In an implementation of the embodiment of the present disclosure, the data acquiring sub-circuit includes:

a fourth transistor, having a control electrode electrically connected to the first scanning signal end and configured to receive the first scanning signal provided by the first scanning signal end, a first electrode electrically connected to the ultrasonic sensor and a second electrode electrically connected to the first end of the first charge storing sub-circuit; the fourth transistor being configured to be turned on under control of the first scanning signal and to transmit the output voltage of the ultrasonic sensor to the first end of the first charge storing sub-circuit when turned on.

In an implementation of the embodiment of the present disclosure, the output controlling sub-circuit includes:

a fifth transistor, having a control electrode electrically connected to a control signal end and configured to receive a control signal provided by the control signal end, a first electrode electrically connected to the second electrode of the driving transistor and a second electrode electrically connected to the signal reading circuit; the fifth transistor being configured to be turned on under control of the control signal and to transmit a signal output by the driving transistor to the signal reading circuit when turned on.

In an implementation of the embodiment of the present disclosure, the first charge storing sub-circuit includes a first capacitor having one end electrically connected to an output end of the data acquiring sub-circuit and the other end which is grounded.

In an implementation of the embodiment of the present disclosure, the second charge storing sub-circuit includes a second capacitor having one end electrically connected to the control electrode of the driving transistor and the other end electrically connected to a first voltage signal end.

In an implementation of the embodiment of the present disclosure, the fingerprint recognition driving circuit further includes a rectifying and integrating sub-circuit. One end of the rectifying and integrating sub-circuit is electrically connected to the first end of the first charge storing sub-circuit, and the other end of the rectifying and integrating sub-circuit is electrically connected to the output end of the data acquiring sub-circuit or the other end is electrically connected to a second voltage signal end and configured to receive a second voltage signal.

In an implementation of the embodiment of the present disclosure, the second voltage signal is a supply voltage signal, i.e., the second voltage signal end is a supply voltage signal end.

In another aspect, an embodiment of the present disclosure further provides a fingerprint recognition module, including an ultrasonic sensor and a fingerprint recognition driving circuit electrically connected to the ultrasonic sensor, and the fingerprint recognition driving circuit is any one of the aforementioned fingerprint recognition driving circuits.

In an implementation of the embodiment of the present disclosure, a driving circuit layer is a Thin Film Transistor (TFT) layer of a TFT substrate.

In an implementation of the embodiment of the present disclosure, the TFT substrate includes a touch area and a peripheral area surrounding the touch area. The ultrasonic sensor is located in the touch area, and a fingerprint recognition signal reading sub-circuit and a bonding pad are provided in the peripheral area.

Optionally, the ultrasonic sensor includes a receiving electrode layer, a piezoelectric material layer and a transmitting electrode layer which are laminated in a direction away from the driving circuit layer, and the driving circuit layer includes the fingerprint recognition driving circuit; or, the ultrasonic sensor includes a transmitting electrode layer located on a first surface of the driving circuit layer, as well as a receiving electrode layer and a piezoelectric material layer which are laminated on a second surface of the driving circuit layer in a direction away from the driving circuit layer, where the first surface and the second surface are two opposite surfaces of the driving circuit layer.

In an implementation of the embodiment of the present disclosure, the receiving electrode layer includes a plurality of receiving electrodes arranged in a matrix, the transmitting electrode layer includes at least one transmitting electrode, and each transmitting electrode corresponds to a plurality of receiving electrodes.

In yet another aspect, an embodiment of the present disclosure further provides a touch screen, including the aforementioned fingerprint recognition module.

In still another aspect, an embodiment of the present disclosure further provides a display device, including the aforementioned touch screen.

In still yet another aspect, an embodiment of the present disclosure further provides a fingerprint recognition driving method applicable to any one of the aforementioned fingerprint recognition driving circuits. The method includes:

writing the output voltage of the ultrasonic sensor into the first end of the first charge storing sub-circuit under control of the first scanning signal;

charging the second charge storing sub-circuit through the first charge storing sub-circuit and the driving transistor under control of the second scanning signal till the potential at the first end of the second charge storing sub-circuit equals the sum of the output voltage of the ultrasonic sensor and the threshold voltage of the driving transistor; and transmitting the current signal output by the driving transistor to the signal reading circuit under control of the control signal.

Optionally, the method further includes:

resetting a potential at the first end of the first charge storing sub-circuit to a first potential under control of a resetting signal; and resetting the potential at the first end of the second charge storing sub-circuit to a second potential under control of a third scanning signal.

BRIEF DESCRIPTION OF THE DRAWINGS

To describe the technical solutions in the embodiments of the present disclosure more clearly, the followings will briefly introduce the accompanying drawings required for describing the embodiments. Apparently, the accompanying drawings in the following descriptions show merely some embodiments of the present disclosure, and a person of ordinary skill in the art may still derive other drawings from these accompanying drawings without creative efforts.

DETAILED DESCRIPTION

To make objectives, technical solutions and advantages of the present disclosure clearer, embodiments of the present disclosure are described in detail below with reference to the accompanying drawings.

An ultrasonic sensor and a driving circuit are usually used together to implement ultrasonic fingerprint recognition technology. The ultrasonic sensor converts a first electric signal into ultrasonic waves for transmission, and converts received reflected ultrasonic waves into a second electric signal. The driving circuit, which includes a diode and a driving transistor, collects and outputs the second electric signal. The diode serves to rectify and integrate the second electric signal output by the ultrasonic sensor, and output the result after rectifying and integrating to a control electrode of the driving transistor, so that the driving transistor may output different current signals according to different DC voltages output by the diode.

Due to the manufacturing process, driving transistors do not have a uniform threshold voltage, and the threshold voltage of the driving transistor may drift over time, which in turn causes current output by the driving transistor to be inconsistent under the same DC voltage, adversely affecting the effect of fingerprint recognition.

Figure 1:
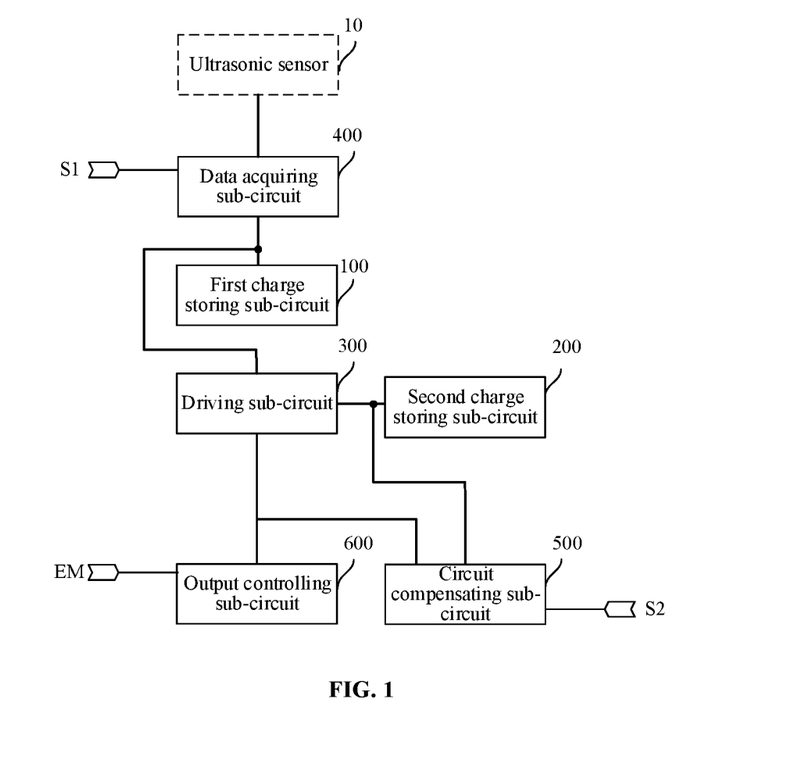
FIG. 1 is a structural block diagram of a fingerprint recognition driving circuit in accordance with an embodiment of the present disclosure.

FIG. 1 is a structural block diagram of a fingerprint recognition driving circuit in accordance with an embodiment of the present disclosure. Referring to FIG. 1, the fingerprint recognition driving circuit includes: a first charge storing sub-circuit 100, a second charge storing sub-circuit 200, a driving sub-circuit 300, a data acquiring sub-circuit 400, a circuit compensating sub-circuit 500, and an output controlling sub-circuit 600.

The data acquiring sub-circuit 400 is electrically connected to a first scanning signal end, an ultrasonic sensor and the first charge storing sub-circuit 100. The data acquiring sub-circuit 400 is configured to write an output voltage of the ultrasonic sensor 10 into a first end of the first charge storing sub-circuit 100 under the control of a first scanning signal received from the first scanning signal end.

The driving sub-circuit 300 includes a driving transistor having a first electrode electrically connected to the first end of the first charge storing sub-circuit 100.

The second charge storing sub-circuit 200 is connected to a control electrode of the driving transistor.

The circuit compensating sub-circuit 500 is electrically connected to a second scanning signal end, a second electrode of the driving transistor and a first end of the second charge storing sub-circuit 200, and is configured to charge the second charge storing sub-circuit 200 through the first charge storing sub-circuit 100 and the driving transistor under the control of a second scanning signal received from the second scanning signal end till a potential at the first end of the second charge storing sub-circuit 200 equals the sum of the output voltage of the ultrasonic sensor 10 and a threshold voltage of the driving transistor.

The output controlling sub-circuit 600 is connected to a control signal inputting end, the second electrode of the driving transistor and a signal reading circuit, and is configured to transmit a current signal output by the driving transistor to the signal reading circuit under the control of a control signal received from the control signal inputting end.

In the driving circuit, the output voltage of the ultrasonic sensor is written into the first end of the first charge storing sub-circuit by the data acquiring sub-circuit; the output voltage of the ultrasonic sensor and the threshold voltage of the driving transistor are written into the first end of the second charge storing sub-circuit by the circuit compensating sub-circuit; and the current signal output by the driving transistor is controlled by the output controlling sub-circuit to be transmitted to the signal reading circuit. Through the circuit compensation, a potential at the control electrode of the driving transistor equals the sum of the output voltage of the ultrasonic sensor and the threshold voltage of the driving transistor, and it can be known from a formula of a current of the driving transistor $I=K(V_{GS}-V_{th})^2$ that the threshold voltage of the driving transistor is offset by the potential at the control electrode of the driving transistor, so the current generated by the driving transistor is not affected by the threshold voltage, avoiding the problem that the current output by the driving transistor is inconsistent due to the inconsistent threshold voltage of the driving transistor, and improving the effect of fingerprint recognition.

Figure 2:
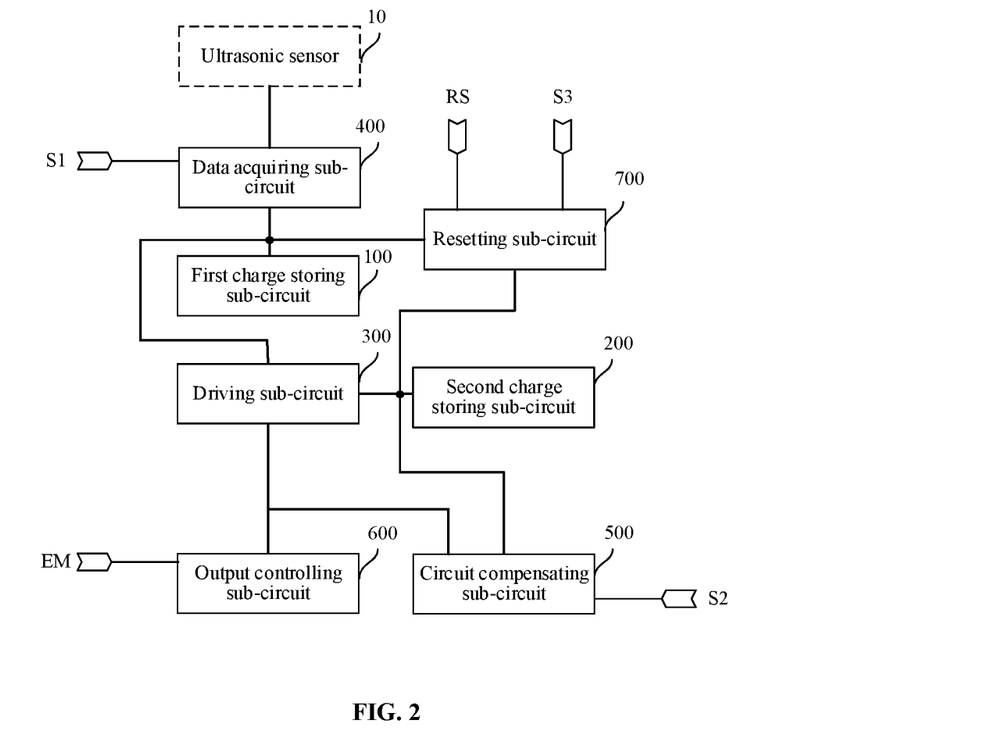
FIG. 2 is a structural block diagram of a fingerprint recognition driving circuit in accordance with an embodiment of the present disclosure.

FIG. 2 is a structural block diagram of another fingerprint recognition driving circuit in accordance with an embodiment of the present disclosure. Different from the fingerprint recognition driving circuit shown in FIG. 1, the fingerprint recognition driving circuit shown in FIG. 2 further includes a resetting sub-circuit 700, which is electrically connected to the first charge storing sub-circuit 100 and the second charge storing sub-circuit 200. The resetting sub-circuit 700 is configured to reset a potential at the first end of the first charge storing sub-circuit 100 to a first potential under the control of a resetting signal, and to reset a potential at the first end of the second charge storing sub-circuit 200 to a second potential under the control of a third scanning signal. Here, the first potential and the second potential are different from each other.

In way of resetting the potential at the first end of the first charge storing sub-circuit to the first potential and resetting the potential at the first end of the second charge storing sub-circuit to the second potential, it can be ensured that the fingerprint recognition driving circuit is in the same initial state at each time of operation, which helps to improve the accuracy of the output of the fingerprint recognition driving circuit.

In embodiments of the present disclosure, the first scanning signal, the second scanning signal, the resetting signal, the third scanning signal and the control signal are all electric signals whose high and low levels change periodically. Voltage values corresponding to the high levels of different signals may be the same or different, and similarly, voltage values corresponding to the low levels of different signals may be the same or different. The voltage values may be set according to actual needs, which is not limited in the present disclosure.

Exemplarily, in the circuit shown by FIG. 1 or FIG. 2, each of the first charge storing sub-circuit 100 and the second charge storing sub-circuit 200 further includes a second end, the second end of the first charge storing sub-circuit 100 is grounded, and the second end of the second charge storing sub-circuit 200 is electrically connected to a first voltage signal end and configured to receive a first voltage signal provided by the first voltage signal end. Exemplarily, the first voltage signal may be a gate high-level signal Vgh.

The fingerprint recognition driving circuit is an active fingerprint recognition driving circuit since a supply voltage signal Vdd is accessed to the fingerprint recognition driving circuit.

Figure 3:
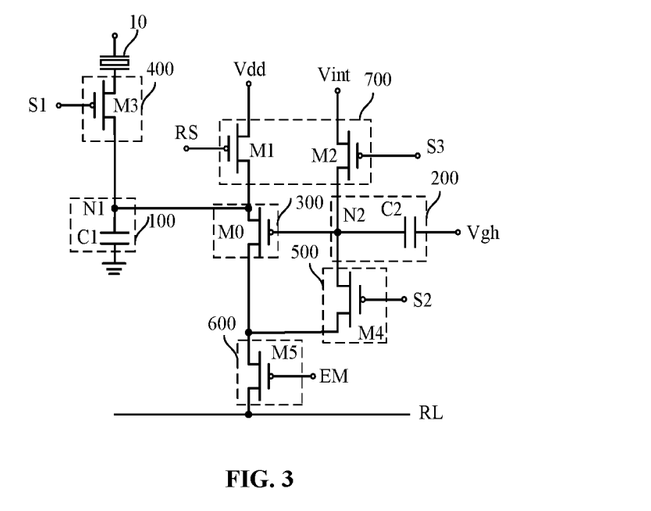
FIG. 3 is a circuit diagram of a fingerprint recognition driving circuit in accordance with an embodiment of the present disclosure.

FIG. 3 is a circuit diagram of a fingerprint recognition driving circuit in accordance with an embodiment of the present disclosure. Referring to FIG. 3, the fingerprint recognition driving circuit includes: a first charge storing sub-circuit 100, a second charge storing sub-circuit 200, a driving sub-circuit 300, a data acquiring sub-circuit 400, a circuit compensating sub-circuit 500 and an output controlling sub-circuit 600 and a resetting circuit 700.

The first charge storing sub-circuit 100 may include a first capacitor C1 having one end electrically connected to an output end of the data acquiring sub-circuit 400 and the other end which is grounded.

The driving sub-circuit 300 includes a driving transistor M0. The second charge storing sub-circuit 200 may include a second capacitor C2 having one end electrically connected to a control electrode of the driving transistor M0. The end of the second capacitor C2 connected to the control electrode of the driving transistor M0 is a first end of the second charge storing sub-circuit 200, and the other end of the second capacitor C2 is electrically connected to a first voltage signal end and configured to receive a first voltage signal through the first voltage signal end.

The circuit compensating sub-circuit 500 may include a first transistor M4. A control electrode of the first transistor M4 is electrically connected to a second scanning signal end and configured to receive a second scanning signal S2, a first electrode of the first transistor M4 is electrically connected to a second electrode of the driving transistor M0, and a second electrode of the first transistor M4 is electrically connected to the control electrode of the driving transistor M0. The first transistor M4 controls conduction and non-conduction between the first electrode and the second electrode under the control of the second scanning signal. When conduction exists between the first electrode and the second electrode, the driving transistor M0 is in the form of a diode, and an electric signal stored in the first charge storing sub-circuit 100 is transmitted to the control electrode of the driving transistor M0 through the driving transistor M0 and the first transistor M4, so as to charge the second charge storing sub-circuit 200.

The resetting sub-circuit 700 may include a second transistor M1 and a third transistor M2.

A control electrode of the second transistor M1 is electrically connected to a resetting signal end and configured to receive a resetting signal RS (ReSet) provided by the resetting signal end; a first electrode of the second transistor M1 is electrically connected to a supply voltage signal end and configured to receive a supply voltage signal Vdd provided by the supply voltage signal end; and a second electrode of the second transistor M1 is electrically connected to a first end of the first charge storing sub-circuit 100.

The second transistor M1 controls conduction and non-conduction between the first electrode and the second electrode under the control of the resetting signal. When conduction exists between the first electrode and the second electrode, the supply voltage signal Vdd is transmitted from the first electrode to the second electrode and then written into the first end of the first charge storing sub-circuit 100, so as to reset the first charge storing sub-circuit 100.

A control electrode of the third transistor M2 is electrically connected to a third scanning signal end and configured to receive a third scanning signal S3 (Scan1) provided by the third scanning signal end; a first electrode of the third transistor M2 is electrically connected to an initial voltage signal end and configured to receive an initial voltage signal Vint provided by the initial voltage signal end; and a second electrode of the third transistor M2 is electrically connected to the first end of the second charge storing sub-circuit 200.

The third transistor M2 controls conduction and non-conduction between the first electrode and the second electrode under the control of the third scanning signal. When conduction exists between the first electrode and the second electrode, the initial voltage signal Vint is transmitted from the first electrode to the second electrode and then written into the first end of the second charge storing sub-circuit 200, so as to reset the second charge storing sub-circuit 200.

Referring to FIG. 3 again, the data acquiring sub-circuit 400 may include a fourth transistor M3.

A control electrode of the fourth transistor M3 is electrically connected to a first scanning signal end and configured to receive a first scanning signal S1 provided by the first scanning signal end; a first electrode of the fourth transistor M3 is electrically connected to an ultrasonic sensor 10; and a second electrode of the fourth transistor M3 is electrically connected to the first end of the first charge storing sub-circuit 100. The fourth transistor M3 controls conduction and non-conduction between the first electrode and the second electrode under the control of the first scanning signal. When conduction exists between the first electrode and the second electrode, an output voltage of the ultrasonic sensor 10 is transmitted from the first electrode to the second electrode and then written into the first end of the first charge storing sub-circuit 100.

Referring to FIG. 3 again, the output controlling sub-circuit 600 may include a fifth transistor M5. A control electrode of the fifth transistor M5 is electrically connected to a control signal end and configured to receive a control signal EM, a first electrode of the fifth transistor M5 is electrically connected to the second electrode of the driving transistor M0, and a second electrode of the fifth transistor M5 is electrically connected to a signal reading circuit. The fifth transistor M5 controls conduction and non-conduction between the first electrode and the second electrode under the control of the control signal. When conduction exists between the first electrode and the second electrode, a signal output by the driving transistor M0 is controlled to be transmitted to the signal reading circuit through the fifth transistor M5, so as to output a fingerprint recognition signal.

Here, the signal reading circuit may be a fingerprint recognition signal read line RL (ReadLine) which may transmit a read fingerprint recognition signal to an integrated circuit, and fingerprint recognition is realized by the integrated circuit.

Figure 4:
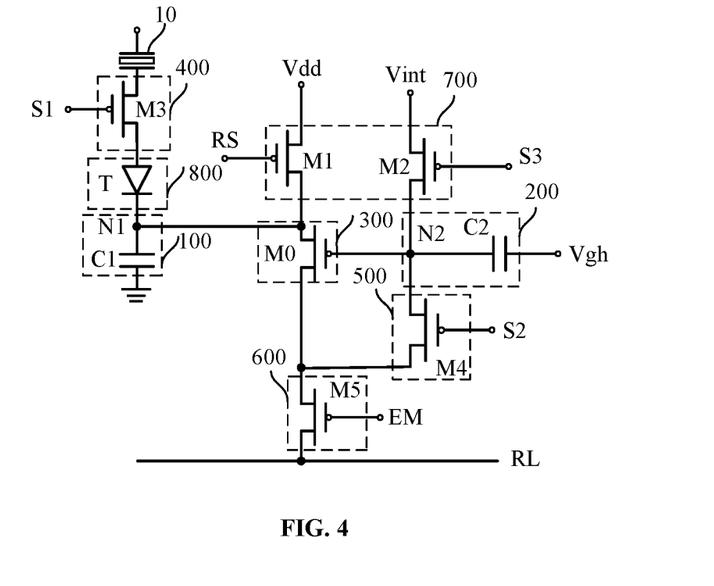
FIG. 4 is a circuit diagram of another fingerprint recognition driving circuit in accordance with an embodiment of the present disclosure.

FIG. 4 is a circuit diagram of another fingerprint recognition driving circuit in accordance with an embodiment of the present disclosure. Referring to FIG. 4, different from the fingerprint recognition driving circuit shown in FIG. 3, the fingerprint recognition driving circuit shown in FIG. 4 further includes a rectifying and integrating sub-circuit 800 having one end electrically connected to the first end of the first charge storing sub-circuit 100 and the other end electrically connected to an output end of the data acquiring sub-circuit 400. That is, the rectifying and integrating sub-circuit 800, connected in series with the data acquiring sub-circuit 400 and the first charge storing sub-circuit 100, is located between the output end of the data acquiring sub-circuit 400 and the first end of the first charge storing sub-circuit 100. The rectifying and integrating sub-circuit 800 receives a voltage signal output by the data acquiring sub-circuit 400, rectifies and integrates the voltage signal, and then outputs the result after rectifying and integrating to a first capacitor C1 for storage.

As shown in FIG. 4, the rectifying and integrating sub-circuit 800 includes a diode T having a cathode electrically connected to a first end of the first capacitor C1 and an anode electrically connected to the output end of the data acquiring sub-circuit 400. The diode T rectifies the voltage signal output by the data acquiring sub-circuit 400, and then accumulates the rectified voltage signal on the first capacitor C1 to perform integration, so that the first capacitor C1 is charged, i.e., the output voltage of the data acquiring sub-circuit 400 is written into one end of the first capacitor C1.

In the present embodiment, the driving transistor M0, the second transistor M1, the third transistor M2, the fourth transistor M3, the first transistor M4 and the fifth transistor M5 may all be thin film transistors, which are small in size, low in power consumption, and convenient and accurate in control.

Optionally, the driving transistor M0 may be a P-channel enhancement metal oxide semiconductor field effect transistor (MOSFET), a P-type bipolar junction transistor (BJT), an N-channel enhancement MOSFET or an N-type BJT. When the driving transistor M0 is a P-channel enhancement MOSFET or a P-type BJT, the control electrode is the gate, the first electrode is the source, the second electrode is the drain, and at this time, the driving transistor M0 is turned on at a low level. When the transistor M0 is an N-channel enhancement MOSFET or an N-type BJT, the control electrode is the gate, the first electrode is the drain, the second electrode is the source, and at this time, the driving transistor M0 is turned on at a high level.

Optionally, the first to fifth transistors M1-M5 may each be one of a junction field effect transistor (JFET), an enhancement MOSFET, a depletion MOSFET and a BJT. The first to fifth transistors M1-M5 may be of the same type or different types.

Optionally, the first to fifth transistors M1-M5 may all be P-type transistors or N-type transistors. When the first to fifth transistors M1-M5 are P-type transistors, the control electrode is the gate, the first electrode is the source, the second electrode is the drain, and at this time, the first to fifth transistors M1-M5 are turned on at low levels. When the first to fifth transistors M1-M5 are N-type transistors, the control electrode is the gate, the first electrode is the drain, the second electrode is the source, and at this time, the first to fifth transistors M1-M5 are turned on at high levels.

Figure 5:
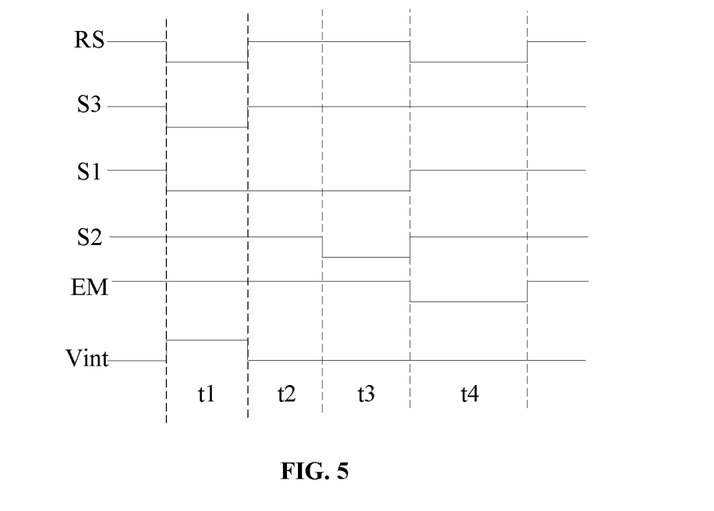
FIG. 5 is a sequence diagram of a control signal of a fingerprint recognition driving circuit in accordance with an embodiment of the present disclosure.

FIG. 5 is a sequence diagram of a control signal of a fingerprint recognition driving circuit in accordance with an embodiment of the present disclosure. It should be noted that the sequence diagram shown in FIG. 5 is a corresponding control signal sequence when each transistor of the fingerprint recognition driving circuit is a P-type transistor. When the transistors of the fingerprint recognition driving circuit are all N-type transistors, a sequence opposite to that of FIG. 5, namely, a sequence whose high levels and low levels are opposite to those in FIG. 5, may be used for control.

As shown in FIG. 5, the sequence of the control signal of the fingerprint recognition driving circuit includes four phases: a resetting phase t1, a data acquisition phase t2, a voltage compensation phase t3, and an output control phase t4.

Figure 6:
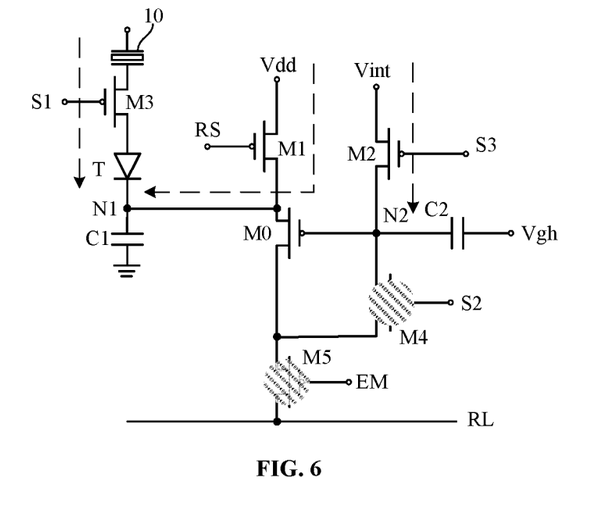
FIG. 6 is a schematic working diagram of a fingerprint recognition driving circuit in a resetting phase t1.

In the resetting phase t1, a resetting signal RS, a third scanning signal S3 and a first scanning signal S1 are at low levels, a second scanning signal S2 and a control signal EM are at high levels, and a potential of an initial voltage signal Vint is 0. FIG. 6 is a schematic working diagram of the fingerprint recognition driving circuit in the resetting phase t1. Referring to FIG. 6, at this time, the driving transistor M0, the second transistor M1, the third transistor M2 and the fourth transistor M3 are turned on, and the first transistor M4 and the fifth transistor M5 are turned off. The transistors covered with shadows in FIG. 6 and the subsequent drawings indicate turn-off, the rest transistors indicate turn-on, and dashed arrows indicate flow directions of electric signals. The second transistor M1 is turned on under the control of the resetting signal RS, and the potential at the first end N1 of the first charge storing sub-circuit 100 is reset to Vdd by a supply voltage signal Vdd, namely, reset to the aforementioned first potential. It should be noted that although the fourth transistor M3 is turned on under the control of the first scanning signal S1 in this phase, since the voltage of the supply voltage signal Vdd is higher than the output voltage of the ultrasonic sensor 10, the diode T is reversely turned off. Moreover, the supply voltage signal Vdd is a continuous high-level signal (the voltage does not change in respective phases), so the potential at the first end N1 of the first charge storing sub-circuit 100 will finally be reset to Vdd. The third transistor M2 is turned on under the control of the third scanning signal S3, and the potential at the first end N2 of the second charge storing sub-circuit 200 is reset to 0 by the initial voltage signal Vint, namely, reset to the aforementioned second potential. After the potential at the first end of the first charge storing sub-circuit 100 becomes Vdd, since a gate-source potential difference $|V_{GS}|$ of the driving transistor M0 is greater than Vth, the driving transistor M0 is turned on at this time.

Figure 7:
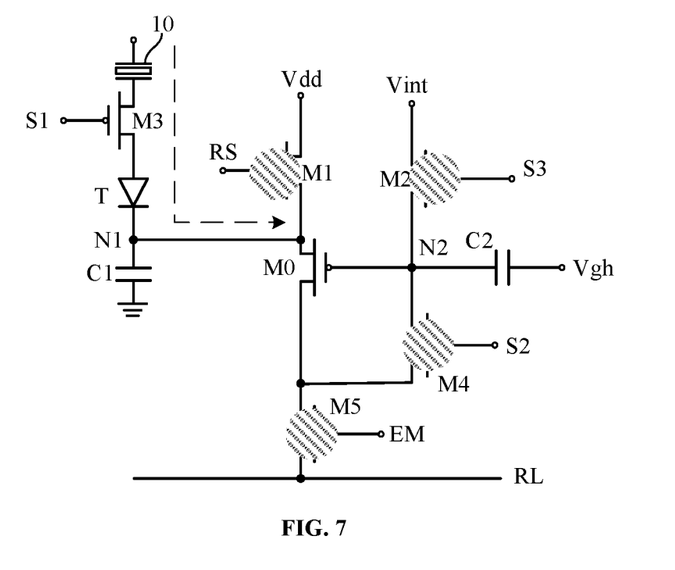
FIG. 7 is a schematic working diagram of a fingerprint recognition driving circuit in a data acquisition phase t2.

In the data acquisition phase t2, the first scanning signal S1 is at a low level, the resetting signal RS, the third scanning signal S3, the second scanning signal S2 and the control signal EM are at high levels, and the initial voltage signal Vint is at a negative level. FIG. 7 is a schematic working diagram of the fingerprint recognition driving circuit in the data acquisition phase t2. Referring to FIG. 7, the driving transistor M0 and the fourth transistor M3 are turned on, and the second transistor M1, the third transistor M2, the first transistor M4, and the fifth transistor M5 are turned off. The fourth transistor M3 is turned on under the control of the first scanning signal S1, and the voltage signal output by the ultrasonic sensor 10 is written into the first end N1 of the first charge storing sub-circuit 100, so that the potential at the first end N1 of the first charge storing sub-circuit 100 is changed to Vdata. However, since the third transistor M2 and the first transistor M4 are turned off, the potential at the first end N2 of the second storage circuit 200 does not change.

Figure 8:
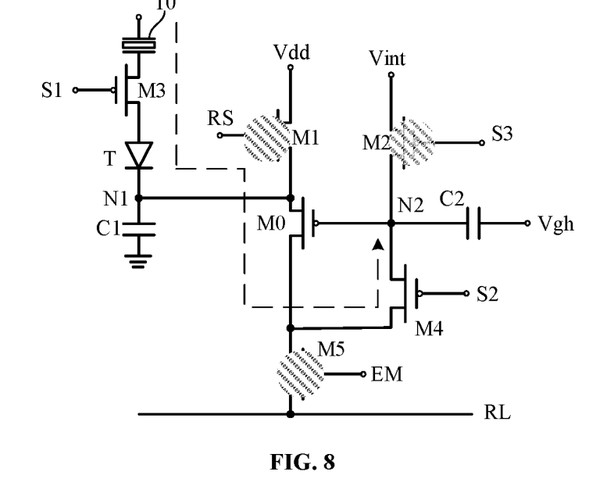
FIG. 8 is a schematic working diagram of a fingerprint recognition driving circuit in a voltage compensation phase t3.

In the voltage compensation phase t3, the first scanning signal S1 and the second scanning signal S2 are at low levels, the resetting signal RS, the third scanning signal S3 and the control signal EM are at high levels, and the initial voltage signal Vint is at a negative level. FIG. 8 is a schematic working diagram of the fingerprint recognition driving circuit in the voltage compensation phase t3. Referring to FIG. 8, at this time, the driving transistor M0, the fourth transistor M3 and the first transistor M4 are turned on, and the second transistor M1, the third transistor M2 and the fifth transistor M5 are turned off. After the potential at the first end N1 of the first charge storing sub-circuit 100 becomes Vdata, since the gate-source potential difference $|V_{GS}|$ of M0 is greater than $V_{th}$, the driving transistor M0 is turned on at this time; and since the first transistor M4 is turned on under the control of the second scanning signal S1 and the fifth transistor M5 is turned off, at this time, the driving transistor M0 forms a diode, and charges stored in the first charge storing sub-circuit 100 are charged to the second charge storing sub-circuit 200 through the driving transistor M0 and the first transistor M4. During charging, the ultrasonic sensor 10 will continuously charge the first charge storing sub-circuit 100. The potential at the first end N2 of the second charge storing sub-circuit 200 continuously increase. When the potential at the first end N2 of the second charge storing sub-circuit 200 reaches Vdata, turn-off condition of the driving transistor M0 is not met and the driving transistor M0 is still turned on. Till the potential at the first end N2 of the second charge storing sub-circuit 200 reaches Vdata+$V_{th}$, at this time, the gate-source potential difference $|V_{GS}|$ of the driving transistor M0 equals to $V_{th}$, the turn-off condition is met and the driving transistor M0 is turned off. It should be noted that a second end of the second charge storing sub-circuit 200 is connected to a first voltage signal, and the first voltage signal is a continuous high-level signal Vgh, thereby avoiding capacitance breakdown caused by excessively high voltages at two ends of the capacitor of the second charge storing sub-circuit 200.

Figure 9:
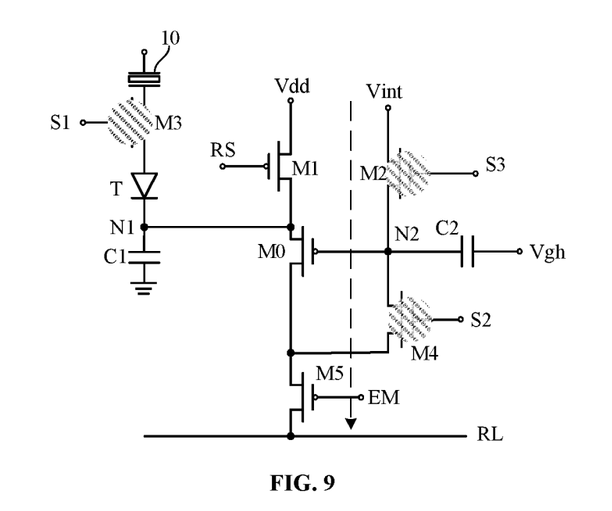
FIG. 9 is a schematic working diagram of a fingerprint recognition driving circuit in an output control phase t4.

In the output control phase t4, the resetting signal RS and the control signal EM are at low levels, the first scanning signal S1, the second scanning signal S2 and the third scanning signal S3 are at high levels, and the initial voltage signal Vint is at a negative level. FIG. 9 is a schematic working diagram of the fingerprint recognition driving circuit in the output control phase t4. Referring to FIG. 9, the driving transistor M0, the second transistor M1 and the fifth transistor M5 are turned on, and the third transistor M2, the fourth transistor M3 and the first transistor M4 are turned off. The second transistor M1 is turned on under the control of the resetting signal RS. When the second transistor M1 is turned on, a potential at the source of the driving transistor M0 becomes Vdd. At this time, the gate-source potential difference $|V_{GS}|$ of M0 is greater than $V_{th}$, and the driving transistor M0 is turned on. Meanwhile, the fifth transistor M5 is turned on under the control of the control signal EM. Since the second transistor M1, the driving transistor M0 and the fifth transistor M5 are turned on simultaneously, a current signal that passes through the second transistor M1, the driving transistor M0 and the fifth transistor M5 is generated under the action of the supply voltage signal Vdd, the current signal is also a fingerprint recognition signal, and the fingerprint recognition signal is finally output to a fingerprint recognition signal read line RL through the fifth transistor M5. In this process, the driving transistor M0 is in a saturated state, and the formula of current is: $I=K(V_{GS}-V_{th})^2$, in which $V_{GS}$=Vdata+$V_{th}$-Vdd, and I=K(Vdata-Vdd)$^2$. It thus can be seen that the current I output by M0 has nothing to do with the threshold voltage $V_{th}$, eliminating the influence of the threshold voltage on the output current of the entire fingerprint recognition driving circuit.

Figure 10:
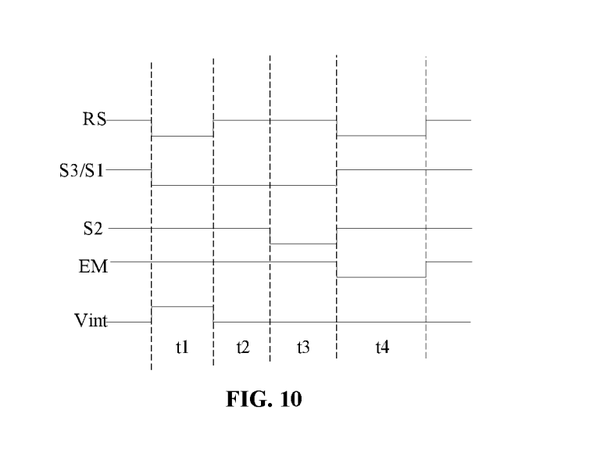
FIG. 10 is another sequence diagram of a control signal of a fingerprint recognition driving circuit in accordance with an embodiment of the present disclosure.

FIG. 10 is another sequence diagram of a control signal of a fingerprint recognition driving circuit in accordance with an embodiment of the present disclosure. The only difference between the sequence of the control signal shown in FIG. 10 and the sequence of the control signal shown in FIG. 5 is the third scanning signal S3. Referring to FIG. 10, the third scanning signal S3 and the first scanning signal S1 have exactly the same waveform, so the third scanning signal S3 and the first scanning signal S1 may be the same signal, i.e., the third scanning signal end and the first scanning signal end are the same signal end.

The third scanning signal S3 and the first scanning signal S1 are the same signal, so one driving signal is omitted and the circuit design is simplified.

It should be noted that in the data acquisition phase t2 and the compensation phase t3, although the same control signal is input to the control electrodes of M2 and M3, the initial voltage signal Vint input to the first electrode of the third transistor M2 is a negative potential, so $|V_{GS}|$ of the third transistor M2 is smaller than the threshold voltage of the third transistor M2 and it is not enough for turning on the third transistor M2; while the first electrode of the fourth transistor M3 is configured to receive the output of the ultrasonic sensor and is at a high potential, $|V_{GS}|$ of the fourth transistor M3 is greater than the threshold voltage of M3, so the fourth transistor M3 is turned on. Therefore, when the third scanning signal S3 and the first scanning signal S1 are the same signal, the states of the third transistor and the fourth transistor in the circuit in the data acquisition phase t2 and the data compensation phase t3 are still the same as those shown in FIGS. 7 and 8.

It should be understood that the circuit structure shown in FIG. 4 and the foregoing working process are merely examples, and implementation modes of the embodiments of the present disclosure may be adjusted according to application requirements in specific application scenarios.

Figure 11:
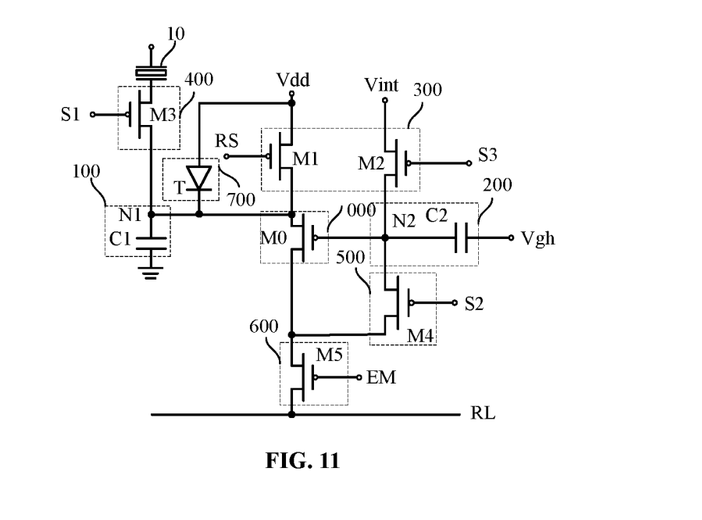
FIG. 11 is a circuit diagram of yet another fingerprint recognition driving circuit in accordance with an embodiment of the present disclosure.

FIG. 11 is a circuit diagram of another fingerprint recognition driving circuit in accordance with an embodiment of the present disclosure. The fingerprint recognition driving circuit shown in FIG. 11 differs from the fingerprint recognition driving circuit shown in FIG. 4 in that the diode T is in different positions. Referring to FIG. 11, one end of the rectifying and integrating sub-circuit 800 is connected to the first end of the first charge storing sub-circuit 100, and the other end of the rectifying and integrating sub-circuit 800 is connected to a second voltage signal end and configured to receive a second voltage signal provided by the second voltage signal end. Exemplarily, the rectifying and integrating sub-circuit 800 includes a diode T having a cathode electrically connected to one end of the first capacitor C1 and an anode which receives the second voltage signal.

When the diode T is connected in the way shown in FIG. 11, in the resetting phase t1, since the voltage of the supply voltage signal Vdd is higher than the output voltage of the ultrasonic sensor 10, an output voltage of the fourth transistor M3 will not affect a resetting effect; in the data acquisition phase t2, when the potential at the cathode (point N1) of the diode rises a lot, the diode T is subjected to reverse breakdown, the diode T generates leakage current from the cathode to the anode, and the leakage current makes the potential at the anode of the diode T rise; and when the potential at the anode of the diode T rises much, the diode T is turned on positively, and the current flows back to N1. However, since the signal output by the ultrasonic sensor is an AC signal, i.e., the signal changes between positive and negative, the working process of the diode T should also be performed periodically to form periodic oscillations so as to finally realize rectification and integration of the signal.

As shown in FIG. 4, the second voltage signal received by the anode of the diode T may be the supply voltage signal Vdd. The second voltage signal is realized by the supply voltage signal, so that one level signal may be omitted and the circuit design is simplified.

Figure 12:
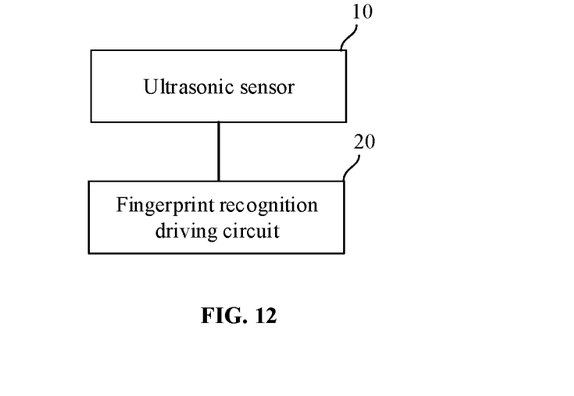
FIG. 12 is a schematic structural diagram of a fingerprint recognition module in accordance with an embodiment of the present disclosure.

FIG. 12 is a schematic structural diagram of a fingerprint recognition module in accordance with an embodiment of the present disclosure. Referring to FIG. 12, the fingerprint recognition module includes an ultrasonic sensor 10 and a fingerprint recognition driving circuit 20 electrically connected to the ultrasonic sensor 10. The fingerprint recognition driving circuit 20 is the fingerprint recognition driving circuit shown in any one of FIG. 1, FIG. 2, FIG. 3, FIG. 4 and FIG. 11.

Figure 13:
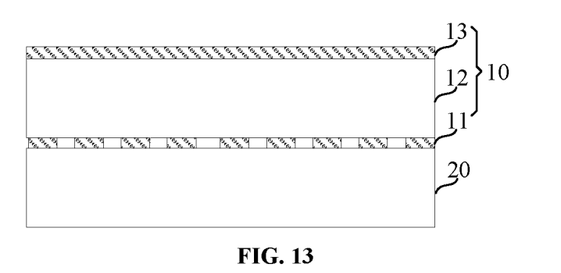
FIG. 13 is a schematic hierarchical structural diagram of the fingerprint recognition module shown in FIG. 12.

FIG. 13 is a schematic hierarchical structural diagram of the fingerprint recognition module shown in FIG. 12. Referring to FIG. 13, the ultrasonic sensor 10 includes a receiving electrode (Rx) layer 11, a piezoelectric material layer 12 and a transmitting electrode (Tx) layer 13 which are laminated in a direction away from a driving circuit layer (20A). The driving circuit layer 20A includes the aforementioned fingerprint recognition driving circuit 20. That is, the receiving electrode layer 11 is located on the driving circuit layer 20A, the piezoelectric material layer 12 is located on the receiving electrode layer 11, and the transmitting electrode layer 13 is located on the piezoelectric material layer 12.

The receiving electrode layer 11 may include a plurality of receiving electrodes arranged in a matrix, and the density of the receiving electrodes is determined based on the fingerprint recognition accuracy. The transmitting electrode layer 13 may include one or more transmitting electrodes, and each transmitting electrode corresponds to a plurality of receiving electrodes. The transmitting electrode layer 13 may be one surface electrode and the surface electrode corresponds to a plurality of receiving electrodes; or the transmitting electrode layer 13 may include a plurality of transmitting electrodes and each transmitting electrode corresponds to a plurality of receiving electrodes.

Correspondingly, each receiving electrode in the fingerprint recognition module is provided with one corresponding fingerprint recognition driving circuit 20. Therefore, the fingerprint recognition driving circuit 20 may be made in the form of a TFT substrate. The TFT substrate includes a base substrate and a TFT layer located on the base substrate, and the TFT layer is the aforementioned driving circuit layer. That is, each transistor in the fingerprint recognition driving circuit 20 is a thin film transistor in the TFT layer.

The TFT layer includes a plurality of film layers, for example, a gate layer, a gate insulating layer, an active layer, a source/drain layer, etc., which are sequentially laminated in a direction away from the base substrate. The present embodiment will not limit the number or the order of the film layers so long as the structure and the function of the aforementioned fingerprint recognition driving circuit can be realized.

Figure 14:
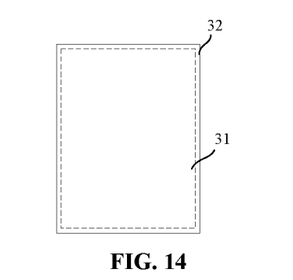
FIG. 14 is a schematic diagram of a TFT substrate in accordance with an embodiment of the present disclosure.

FIG. 14 is a schematic diagram of a TFT substrate in accordance with an embodiment of the present disclosure. Referring to FIG. 14, the TFT substrate includes a touch area 31 and a peripheral area 32 surrounding the touch area 31. The ultrasonic sensor 10 may only be disposed on the touch area 31 of the TFT substrate, and the peripheral area 32 of the TFT substrate may be used for arranging the aforementioned fingerprint recognition signal read line RL and a bonding pad. The bonding pad is electrically connected to the fingerprint recognition signal read line RL, and is further connected to a Flexible Printed Circuit (FPC) board so as to output, through the FPC board, a fingerprint recognition signal to an external integrated circuit for processing.

The hierarchical structural diagram of the fingerprint recognition module shown in FIG. 13 is merely an example, and the hierarchical structure of the fingerprint recognition module may also be implemented in other ways, for example, respective layers of the fingerprint recognition module are sequentially laminated in the order of the transmitting electrode layer, the fingerprint recognition driving circuit, the receiving electrode layer and the piezoelectric material layer. That is, the ultrasonic sensor includes a transmitting electrode layer on a first surface of the driving circuit layer, as well as a receiving electrode layer and a piezoelectric material layer which are laminated on a second surface of the driving circuit layer in a direction away from the driving circuit layer, where the first surface and the second surface are two opposite surfaces of the driving circuit layer.

In an embodiment of the present disclosure, the piezoelectric material layer 12 may be a polyvinylidene fluoride (PVDF) piezoelectric material layer.

During operation, AC voltages are input onto the transmitting electrode and the receiving electrode of the ultrasonic sensor 10. The piezoelectric material layer 12 generates ultrasonic waves under the action of alternating current. The ultrasonic waves are enhanced by a cavity between a finger and the ultrasonic sensor 10, and then transmitted out. After the ultrasonic emission is completed, a fixed voltage (e.g., a low-level signal) is applied to the transmitting electrode to control the transmitting electrode to stop working.

When the emitted ultrasonic waves touch the finger of the user, reflected ultrasonic waves are generated. After arriving at the piezoelectric material layer 12, the reflected ultrasonic waves will be converted into AC voltages and then output to the driving circuit through the receiving electrode. Since there are valleys and ridges on the finger of the user, the reflected ultrasonic waves arriving at the piezoelectric material layer 12 have different energies, which in turn makes converted electric energies different, i.e., different electric energies are acquired at different positions of the piezoelectric material layer 12. Therefore, whether corresponding positions are the valleys or the ridges of the finger may be determined based on different magnitudes of the currents output by the driving circuits 20 in different positions, and further, a fingerprint image may be generated.

An embodiment of the present disclosure further provides a touch screen, including the aforementioned fingerprint recognition module.

Since the touch screen provided by the embodiment of the present disclosure has the same technical features as any one of the fingerprint recognition driving circuits described above, they may solve the same technical problem and produce the same technical effects.

An embodiment of the present disclosure further provides a display device, including a display screen and the aforementioned touch screen. The display device may be any product or component having a display function, such as an electronic paper, an OLED panel, a mobile phone, a tablet computer, a TV, a display, a laptop, a digital photo frame or a navigator.

Since the display device provided by the embodiment of the present disclosure has the same technical features as any one of the fingerprint recognition driving circuits described above, they may solve the same technical problem and produce the same technical effects.

Figure 15:
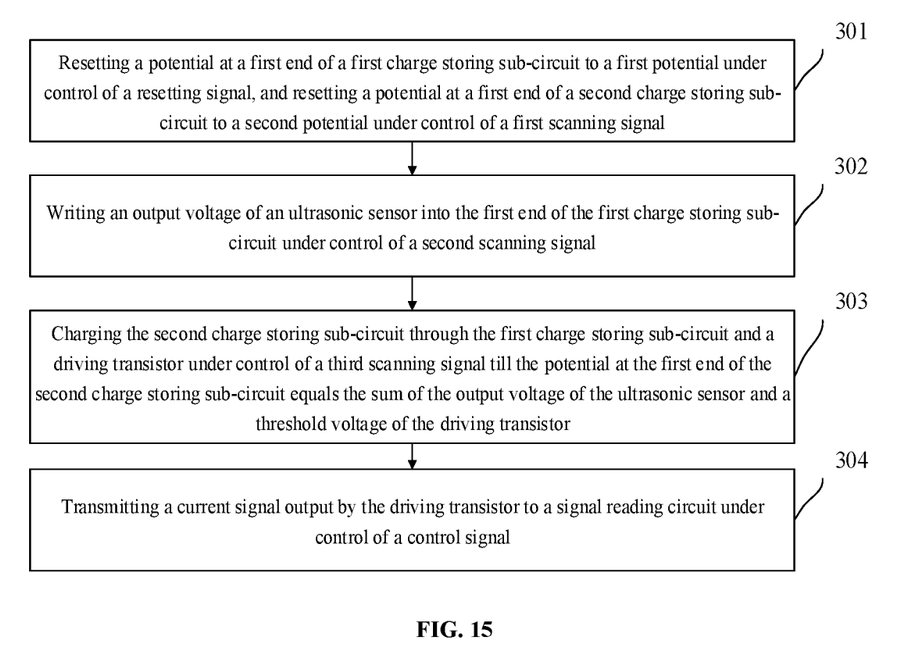
FIG. 15 is a flow chart of a fingerprint recognition driving method in accordance with an embodiment of the present disclosure.

FIG. 15 is a flow chart of a fingerprint recognition driving method in accordance with an embodiment of the present disclosure. This method is applicable to the fingerprint recognition driving circuit shown in any one of FIG. 1, FIG. 2, FIG. 3, FIG. 4 and FIG. 11. Referring to FIG. 15, the method includes the following steps.

In step 301, a potential at a first end of a first charge storing sub-circuit is reset to a first potential under the control of a resetting signal, and a potential at a first end of a second charge storing sub-circuit is reset to a second potential under the control of a third scanning signal.

The first potential is at a high level, and the second potential is 0.

In an embodiment of the present disclosure, step 301 may include: controlling a second transistor M1 to be turned on, to enable a supply voltage signal Vdd to be written into the first end of the first charge storing sub-circuit through the second transistor M1; controlling a third transistor M2 to be turned on, to enable an initial voltage signal Vint to be written into the first end of the second charge storing sub-circuit through the third transistor M2. The second transistor M1 is controlled by a resetting signal RS, and the third transistor M2 is controlled by a third scanning signal S2.

A reference may be made to FIGS. 5 and 6 and related descriptions for step 301.

In step 302, an output voltage of an ultrasonic sensor is written into the first end of the first charge storing sub-circuit under the control of a first scanning signal.

In an embodiment of the present disclosure, step 302 may include: controlling a fourth transistor M3 to be turned on, to enable a signal output by the ultrasonic sensor to be written into the first end of the first charge storing sub-circuit through the fourth transistor M3. The fourth transistor M3 is controlled by the first scanning signal S3.

A reference may be made to FIGS. 5 and 7 and related descriptions for step 302.

In addition to the aforementioned implementation, in other implementations, the third scanning signal S2 and the first scanning signal S3 may be the same signal. That is, in a data acquisition phase t2, the third scanning signal S2 and the first scanning signal S3 are both at low levels and adopt the same driving signal. Therefore, one driving signal is omitted and the circuit design is simplified.

In step 303, the second charge storing sub-circuit is charged by the first charge storing sub-circuit and a driving transistor under the control of the third scanning signal till the potential at the first end of the second charge storing sub-circuit equals the sum of the output voltage of the ultrasonic sensor and a threshold voltage of the driving transistor.

In an embodiment of the present disclosure, step 303 may include: controlling the fourth transistor M3 and the first transistor M4 to be turned on, to enable the first charge storing sub-circuit to charge the second charge storing sub-circuit. The fourth transistor M3 is controlled by the first scanning signal S3, and the first transistor M4 is controlled by the third scanning signal S1.

A reference may be made to FIGS. 5 and 8 and related descriptions for step 303.

In step 304, a current signal output by the driving transistor is transmitted to a signal reading circuit under the control of a control signal.

In an embodiment of the present disclosure, step 304 may include: controlling the second transistor M1 and a fifth transistor M5 to be turned on, to enable the current signal output by the driving transistor to be transmitted to the signal reading circuit. The second transistor M1 is controlled by the resetting signal RS, and the fifth transistor M5 is controlled by the control signal EM.

A reference may be made to FIGS. 5 and 9 and related descriptions for step 304.

The foregoing described embodiments are merely preferred embodiments of the present disclosure, and are not intended to limit the present disclosure. Any modifications, equivalent substitutions, improvements, etc. made without departing from the spirit and principles of the present disclosure shall fall within the protection scope of the present disclosure.

What is claimed is:

1. A fingerprint recognition driving circuit, comprising:
   a first charge storing sub-circuit;
   a data acquiring sub-circuit, which is electrically connected to a first scanning signal end, an ultrasonic sensor and a first end of the first charge storing sub-circuit and is configured to write an output voltage of the ultrasonic sensor into the first end of the first charge storing sub-circuit under control of a first scanning signal received from the first scanning signal end;
   a driving sub-circuit, comprising a driving transistor having a first electrode electrically connected to the first end of the first charge storing sub-circuit;
   a second charge storing sub-circuit having a first end electrically connected to a control electrode of the driving transistor;
   a circuit compensating sub-circuit, which is electrically connected to a second scanning signal end, a second electrode of the driving transistor and the first end of the second charge storing sub-circuit and is configured to charge the second charge storing sub-circuit through the first charge storing sub-circuit and the driving transistor under control of a second scanning signal received from the second scanning signal end till a potential at the first end of the second charge storing sub-circuit equals a sum of the output voltage of the ultrasonic sensor and a threshold voltage of the driving transistor; and
   an output controlling sub-circuit, which is electrically connected to a control signal inputting end, the second electrode of the driving transistor and a signal reading circuit and is configured to transmit a current signal output by the driving transistor to the signal reading circuit under control of a control signal received from the control signal inputting end.

2. The fingerprint recognition driving circuit according to claim 1, wherein the circuit compensating sub-circuit comprises:
   a first transistor, having a control electrode electrically connected to the second scanning signal end, a first electrode electrically connected to the second electrode of the driving transistor, and a second electrode electrically connected to the first end of the second charge storing sub-circuit.

3. The fingerprint recognition driving circuit according to claim 1, further comprising:
- a resetting sub-circuit, which is electrically connected to a resetting signal end, a third scanning signal end, the first end of the first charge storing sub-circuit and the first end of the second charge storing sub-circuit and is configured to reset a potential at the first end of the first charge storing sub-circuit to a first potential under control of a resetting signal received from the resetting signal end, and reset the potential at the first end of the second charge storing sub-circuit to a second potential under control of a third scanning signal received from the third scanning signal end, the first potential being different from the second potential.

4. The fingerprint recognition driving circuit according to claim 3, wherein the resetting sub-circuit comprises:
- a second transistor, having a control electrode electrically connected to the resetting signal end, a first electrode electrically connected to a supply voltage signal end, and a second electrode electrically connected to the first end of the first charge storing sub-circuit; and
- a third transistor, having a control electrode electrically connected to the third scanning signal end, a first electrode electrically connected to an initial voltage signal end and a second electrode electrically connected to the first end of the second charge storing sub-circuit.

5. The fingerprint recognition driving circuit according to claim 3, wherein the third scanning signal end and the first scanning signal end are the same signal end.

6. The fingerprint recognition driving circuit according to claim 1, wherein the data acquiring sub-circuit comprises:
- a fourth transistor, having a control electrode electrically connected to the first scanning signal end, a first electrode electrically connected to the ultrasonic sensor and a second electrode electrically connected to the first end of the first charge storing sub-circuit.

7. The fingerprint recognition driving circuit according to claim 1, wherein the output controlling sub-circuit comprises:
- a fifth transistor, having a control electrode electrically connected to a control signal end, a first electrode electrically connected to the second electrode of the driving transistor and a second electrode electrically connected to the signal reading circuit.

8. The fingerprint recognition driving circuit according to claim 1, wherein the first charge storing sub-circuit comprises:
- a first capacitor, having one end electrically connected to an output end of the data acquiring sub-circuit and the other end which is grounded.

9. The fingerprint recognition driving circuit according to claim 1, wherein the second charge storing sub-circuit comprises:
- a second capacitor, having one end electrically connected to the control electrode of the driving transistor and the other end electrically connected to a first voltage signal end.

10. The fingerprint recognition driving circuit according to claim 1, further comprising:
- a rectifying and integrating sub-circuit, wherein one end of the rectifying and integrating sub-circuit is electrically connected to the first end of the first charge storing sub-circuit and the other end of the rectifying and integrating sub-circuit is electrically connected to an output end of the data acquiring sub-circuit or connected to a second voltage signal end.

11. The fingerprint recognition driving circuit according to claim 10, wherein the second voltage signal end is a supply voltage signal end.

12. A fingerprint recognition module, comprising an ultrasonic sensor and a fingerprint recognition driving circuit electrically connected to the ultrasonic sensor, wherein the fingerprint recognition driving circuit comprises:
- a first charge storing sub-circuit;
- a data acquiring sub-circuit, which is electrically connected to a first scanning signal end, an ultrasonic sensor and a first end of the first charge storing sub-circuit and is configured to write an output voltage of the ultrasonic sensor into the first end of the first charge storing sub-circuit under control of a first scanning signal received from the first scanning signal end;
- a driving sub-circuit, comprising a driving transistor having a first electrode electrically connected to the first end of the first charge storing sub-circuit;
- a second charge storing sub-circuit having a first end electrically connected to a control electrode of the driving transistor;
- a circuit compensating sub-circuit, which is electrically connected to a second scanning signal end, a second electrode of the driving transistor and the first end of the second charge storing sub-circuit and is configured to charge the second charge storing sub-circuit through the first charge storing sub-circuit and the driving transistor under control of a second scanning signal received from the second scanning signal end till a potential at the first end of the second charge storing sub-circuit equals a sum of the output voltage of the ultrasonic sensor and a threshold voltage of the driving transistor; and
- an output controlling sub-circuit, which is electrically connected to a control signal inputting end, the second electrode of the driving transistor and a signal reading circuit and is configured to transmit a current signal output by the driving transistor to the signal reading circuit under control of a control signal received from the control signal inputting end.

13. The fingerprint recognition module according to claim 12, wherein a driving circuit layer is a thin film transistor (TFT) layer of a TFT substrate.

14. The fingerprint recognition module according to claim 13, wherein the TFT substrate comprises a touch area and a peripheral area surrounding the touch area, wherein the ultrasonic sensor is located in the touch area, and a fingerprint recognition signal reading sub-circuit and a bonding pad are provided in the peripheral area.

15. The fingerprint recognition module according to claim 12, wherein the ultrasonic sensor comprises a receiving electrode layer, a piezoelectric material layer and a transmitting electrode layer which are laminated in a direction away from the driving circuit layer, and the driving circuit layer comprises the fingerprint recognition driving circuit; or
- the ultrasonic sensor comprises a transmitting electrode layer located on a first surface of the driving circuit layer, as well as a receiving electrode layer and a piezoelectric material layer which are laminated on a second surface of the driving circuit layer in a direction away from the driving circuit layer, wherein the first surface and the second surface are two opposite surfaces of the driving circuit layer.

16. The fingerprint recognition module according to claim 15, wherein the receiving electrode layer comprises a plurality of receiving electrodes arranged in a matrix, the transmitting electrode layer comprises at least one transmitting electrode, and each transmitting electrode corresponds to a plurality of receiving electrodes.

17. A touch screen, comprising the fingerprint recognition module according to claim 12.

18. A display device, comprising a display screen and a touch screen according to claim 17.

19. A fingerprint recognition driving method, which is applicable to a fingerprint recognition driving circuit, the fingerprint recognition driving circuit, comprising:
  a first charge storing sub-circuit;
  a data acquiring sub-circuit, which is electrically connected to a first scanning signal end, an ultrasonic sensor and a first end of the first charge storing sub-circuit and is configured to write an output voltage of the ultrasonic sensor into the first end of the first charge storing sub-circuit under control of a first scanning signal received from the first scanning signal end;
  a driving sub-circuit, comprising a driving transistor having a first electrode electrically connected to the first end of the first charge storing sub-circuit;
  a second charge storing sub-circuit having a first end electrically connected to a control electrode of the driving transistor;
  a circuit compensating sub-circuit, which is electrically connected to a second scanning signal end, a second electrode of the driving transistor and the first end of the second charge storing sub-circuit and is configured to charge the second charge storing sub-circuit through the first charge storing sub-circuit and the driving transistor under control of a second scanning signal received from the second scanning signal end till a potential at the first end of the second charge storing sub-circuit equals a sum of the output voltage of the ultrasonic sensor and a threshold voltage of the driving transistor; and
  an output controlling sub-circuit, which is electrically connected to a control signal inputting end, the second electrode of the driving transistor and a signal reading circuit and is configured to transmit a current signal output by the driving transistor to the signal reading circuit under control of a control signal received from the control signal inputting end;
  wherein the fingerprint recognition driving method comprises:
  writing the output voltage of the ultrasonic sensor into the first end of the first charge storing sub-circuit under control of the first scanning signal;
  charging the second charge storing sub-circuit through the first charge storing sub-circuit and the driving transistor under control of the second scanning signal till the potential at the first end of the second charge storing sub-circuit equals the sum of the output voltage of the ultrasonic sensor and the threshold voltage of the driving transistor; and
  transmitting the current signal output by the driving transistor to the signal reading circuit under control of the control signal.

20. The fingerprint recognition driving method according to claim 19, further comprising:
  resetting a potential at the first end of the first charge storing sub-circuit to a first potential under control of a resetting signal; and
  resetting the potential at the first end of the second charge storing sub-circuit to a second potential under control of a third scanning signal.

* * * * *